(12) United States Patent
Zhao et al.

(10) Patent No.: US 9,323,837 B2
(45) Date of Patent: Apr. 26, 2016

(54) MULTIPLE DOMAIN ANOMALY DETECTION SYSTEM AND METHOD USING FUSION RULE AND VISUALIZATION

(76) Inventors: Ying Zhao, Cupertino, CA (US);
Charles C. Zhou, Cupertino, CA (US);
Chetan Kotak, San Jose, CA (US)

( * ) Notice: Subject to any disclaimer, the term of this patent is extended or adjusted under 35 U.S.C. 154(b) by 0 days.

(21) Appl. No.: 13/204,713

(22) Filed: Aug. 7, 2011

(65) Prior Publication Data
US 2011/0295783 A1    Dec. 1, 2011

Related U.S. Application Data

(63) Continuation-in-part of application No. 12/042,338, filed on Mar. 5, 2008, now abandoned, and a continuation-in-part of application No. 13/103,121, filed on May 9, 2011, now abandoned.

(51) Int. Cl.
*G06F 17/30* (2006.01)
(52) U.S. Cl.
CPC .............................. *G06F 17/30702* (2013.01)
(58) Field of Classification Search
CPC .................................................. G06F 17/30702
USPC .......................................................... 707/740
See application file for complete search history.

(56) References Cited

U.S. PATENT DOCUMENTS

| | | | |
|---|---|---|---|
| 8,090,592 B1 * | 1/2012 | Goodall et al. | 705/2 |
| 2006/0059063 A1 * | 3/2006 | LaComb et al. | 705/35 |
| 2006/0156404 A1 * | 7/2006 | Day | H04L 63/1408 726/23 |
| 2008/0103855 A1 * | 5/2008 | Hernandez | G06Q 30/02 705/7.33 |
| 2010/0100693 A1 * | 4/2010 | Kerley et al. | 711/154 |
| 2011/0213744 A1 * | 9/2011 | Sparling | G05B 23/0227 706/46 |
| 2014/0181968 A1 * | 6/2014 | Ge | H04L 63/1425 726/23 |

OTHER PUBLICATIONS

Mutz et al., "Anomalous System Call Detection," Feb. 2006, ACM Transactions on Information and System Security, vol. 9, No. 1, pp. 61-93.*

* cited by examiner

*Primary Examiner* — Jensen Hu
(74) *Attorney, Agent, or Firm* — Invent Capture, LLC.; Samuel S. Cho

(57) ABSTRACT

The present invention discloses various embodiments of multiple domain anomaly detection systems and methods. In one embodiment of the invention, a multiple domain anomaly detection system uses a generic learning procedure per domain to create a "normal data profile" for each domain based on observation of data per domain, wherein the normal data profile for each domain can be used to determine and compute domain-specific anomaly data per domain. Then, domain-specific anomaly data per domain can be analyzed together in a cross-domain fusion data analysis using one or more fusion rules. The fusion rules may involve comparison of domain-specific anomaly data from multiple domains to derive a multiple-domain anomaly score meter for a particular cross-domain analysis task. The multiple domain anomaly detection system and its related method may also utilize domain-specific anomaly indicators of each domain to derive a cross-domain anomaly indicator using the fusion rules.

14 Claims, 7 Drawing Sheets

| Time | Event Name | Severity |
|---|---|---|
| 13:13:30 PST 02/12/2008 | Slow motorboats in the lake; Clear weather; No high-traffic event currently in the lake | Moderately Anomalous |
| 18:10:15 PST 02/12/2008 | Very slow motorboat speed; Foggy weather; No high-traffic event currently in the lake | Potentially Anomalous |
| 08:05:20 PST 02/13/2008 | Faster motorboat speed than average historical data of the lake; Rainy weather; A high-traffic event currently in the lake | Highly Anomalous |

FIG. 7

MULTIPLE DOMAIN ANOMALY DETECTION SYSTEM AND METHOD USING FUSION RULE AND VISUALIZATION

BACKGROUND OF THE INVENTION

The present invention relates to domain-specific and cross-domain analysis of information involving multiple domains. More specifically, various embodiments of the present invention relate to using a system and a related method to determine anomalous data from each domain and using fusion rules to improve accuracy and relevance of combined analysis of anomalous data across multiple domains for triggering a critical event notification.

For applications requiring a critical event notification based on data analysis on a single domain (i.e. one particular environment or one knowledge dimension for data monitoring and gathering), anomaly detection systems allow identification of anomalous data which deviate from the norm in a dataset. The conventional anomaly detection systems and methods have been applied to many fields involving information technology. Fraud detection systems in financial and/or insurance business, computer network protection and intrusion detection systems, and health surveillance systems with critical event detection capabilities may utilize the concept of anomaly detection. An anomaly detection system typically requires gathering or sampling of data in a particular domain for a model building process in order to construct a normal data profile which can be used to detect and determine any meaningful deviation from the normal data profile as anomalous data.

Conventional anomaly detection systems tend to generate many false alarm rates because they tend to be overly domain-dependent and/or lack coherent methods to analyze domain-specific anomalous data across multiple domains. For example, anomalous data from a first domain may be triggered as a critical event in a conventional anomaly detection system, even if datasets from a second domain can explain why the anomalous data occurred in the first domain. For example, a conventional anomaly detection system may determine a motorboat with a velocity far greater than the average speed of motorboats in the same region is worthy of a critical event notification and may inform users accordingly. However, this critical event notification may simply be a false alarm in some instances, because the conventional anomaly detection system may fail to take data from other domains (i.e. domains outside of motorboat speed monitoring), such as the current weather conditions and a news event impacting in the same region into account for determining what should be considered an anomalous event worthy of a critical event notification.

Furthermore, the conventional anomaly detection systems tend to manually define what triggers a data set to be anomalous. For example, in the motorboat example above, a conventional anomaly detection system may define a data anomaly trigger at 45 miles per hour, which makes any motorboats traveling above 45 miles per hour to be flagged for a critical event notification. Therefore, the conventional anomaly detection system tends to be inflexible in taking dynamically-changing normal data profile into account for generating a critical event notification. The manually-set trigger for anomalous data makes conventional anomaly detection systems to be prone to false alarms during critical event monitoring.

Therefore, novel systems and methods which utilizes generic learning processes to create and update normal data profiles in each domain and then determine anomalous data per each domain may be advantageous. Furthermore, novel systems and methods which use fusion rules to analyze anomalous data from multiple domains to improve accuracy and relevance of a critical event notification to a user may also be highly advantageous.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a fusion rule-based anomaly detection system is disclosed. In one example, this system comprises: a learning agent for each domain configured to transmit a piece of new information to a data mining engine module operatively connected to the learning agent; a normal data profile for each domain executable on a CPU and a memory unit of a computer, wherein the normal data profile is created by a generic learning procedure and data collection using the learning agent; an anomaly detection engine module for each domain operatively connected to the data mining engine module for each domain, wherein the anomaly detection engine is configured to compare the piece of new information against the normal data profile to derive an anomaly score for each domain; a multiple-domain anomaly detection system operatively connected to a plurality of domain-specific anomaly detection systems, wherein each domain-specific anomaly detection system contains its own learning agent, its own normal data profile, and its own anomaly detection engine; a fusion rule executable on a CPU and a memory unit of the multiple-domain anomaly detection system, wherein the fusion rule derives a multiple-domain anomaly score based on an analysis of anomaly scores for each domain or other outputs from the plurality of domain-specific anomaly detection systems; and a data network operatively connecting the multiple-domain anomaly detection system and the plurality of domain-specific anomaly detection systems for data communication.

Furthermore, in another embodiment of the invention, a method for assessing a piece of new information against a particular domain and also against a plurality of other domains using a multiple-domain anomaly detection system is disclosed. In one example, this method comprises the steps of: determining a magnitude of data anomaly for the piece of new information in the particular domain by comparing a normal data profile of the particular domain against the piece of new information to derive a domain-specific anomaly score for the particular domain; using the multiple-domain anomaly detection system to receive the domain-specific anomaly score for the particular domain and any other desired domain-specific anomaly scores from other domains; and applying a fusion rule among the domain-specific anomaly score and any other desired domain-specific anomaly scores from other domains to derive a multiple-domain anomaly score.

BRIEF DESCRIPTION OF DRAWINGS

FIG. 7 shows a critical event table derived from an anomaly detection system, in accordance with an embodiment of the invention.

DETAILED DESCRIPTION

Figure 1:
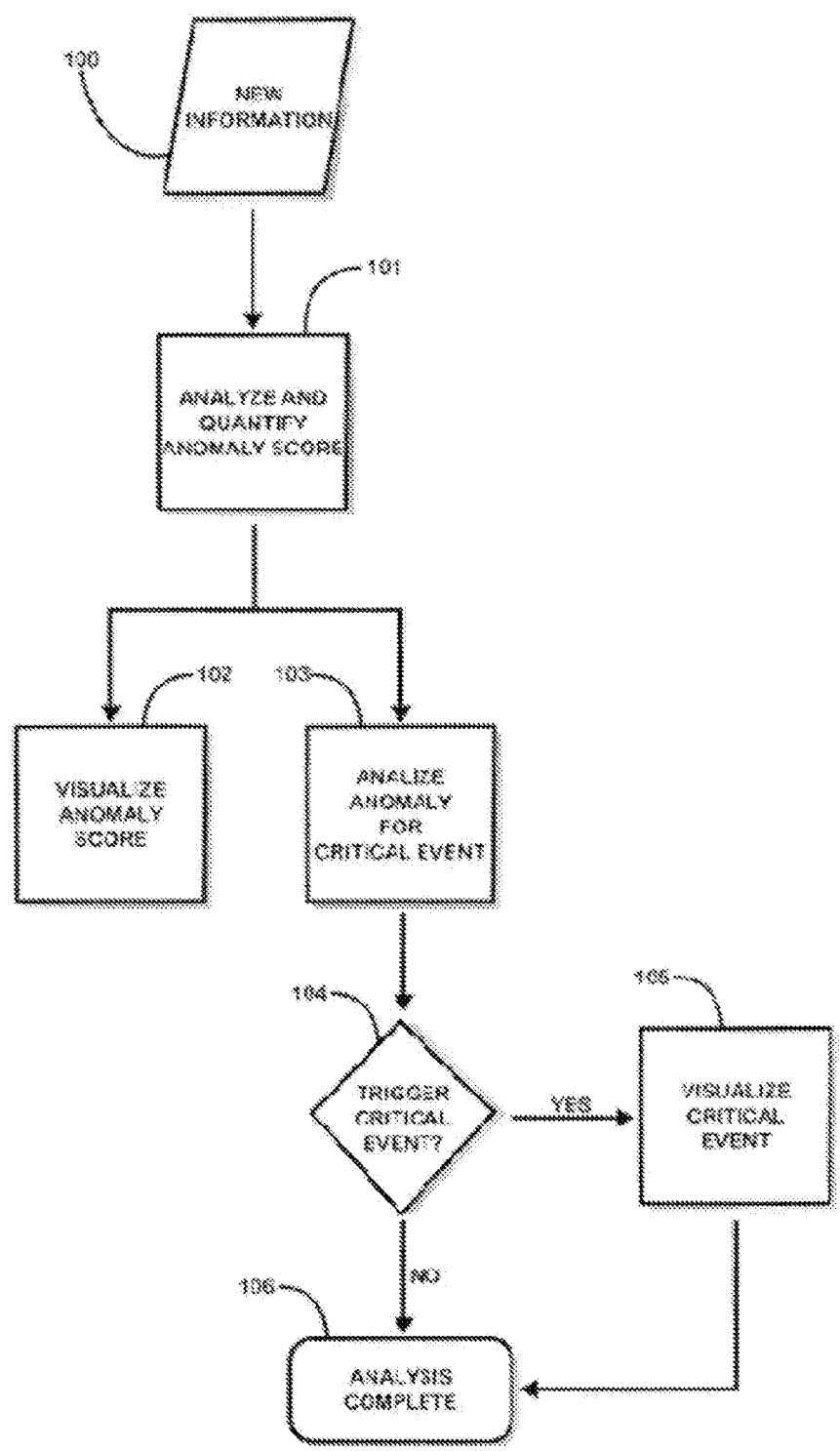
FIG. 1 shows a flowchart for analyzing and visualizing anomalous data as anomaly scores and graphical information, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for multiple domain anomaly detection systems using fusion rules and related visualizations. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "domain" is defined as one particular environment or one particular knowledge dimension for data monitoring and gathering. For example, one domain may be associated with velocity monitoring of motorboats on a lake, while another domain may be associated with search term monitoring on an Internet search engine. A "singular domain" refers to one specific environment for data monitoring and gathering. In contrast, "multiple domains" refer to a plurality of environments which may be subject to data monitoring and gathering.

Furthermore, for the purpose of describing the invention, a "domain-specific" or "domain-dependent" analysis refers to analyzing data using specific data profiles represented in one particular domain. In addition, for the purpose of describing the invention, a "cross-domain" analysis refers to analyzing data using data profiles (e.g. normal data profiles, anomalous data, and etc.) represented in multiple domains. For example, a fusion rule in one embodiment of the present invention may involve cross-domain analysis datasets or outputs from multiple domains for deriving a multiple-domain anomaly score.

In addition, for the purpose of describing the invention, a "domain-independent" analysis refers to using generic criteria which do not take specific conditions of domains into account for data analysis. For example, a fusion rule in one embodiment of the present invention may be blind to specific conditions of each domain in deriving an anomaly score from multiple domains by using domain-independent fusion rules. For instance, a fused (i.e. multiple-domain) average anomaly score calculated from numerous anomaly scores from multiple domains may be considered a domain-independent analysis.

Furthermore, for the purpose of describing the invention, a term "normal data profile" is defined as a dataset, a discovery of patterns, and/or a discovery of groupings or clusters, which do not deviate substantially from a majority of data points, patterns, groupings, or clusters. In a preferred embodiment of the invention, the majority of data points, patterns, groupings, or clusters is considered to be typical or "normal" in a domain to constitute a normal data profile. For example, a dataset which is clustered around a median value or an average value from all data points may constitute a "normal data profile." In another example, a pattern or a grouping may simply be defined as typical or normal in a domain by a manually-specified rule. In a preferred embodiment of the invention, a normal data profile for a particular domain can be dynamically created after undergoing a certain amount of data collection, because an anomaly detection system can determine the majority of data points vs. deviated data points based on collected data. Therefore, in the preferred embodiment of the invention, a normal data profile is dynamically constructed and is not manually pre-defined prior to data collection in a domain.

In addition, for the purpose of describing the invention, terms "anomaly," or "anomalous data" are defined as one or more data points which substantially deviate from a normal data profile. For example, a data point which falls substantially outside of the ranges of standard deviation may be considered an anomaly or anomalous data. An anomaly or anomalous data does not necessarily indicate that this is malicious or harmful data. Rather, the anomaly or the anomalous data may be considered information of unusual characteristics or information of interest.

Moreover, for the purpose of describing the invention, a term "fusion rule" is defined as an analytical rule or a condition which may be applied to datasets or outputs from a plurality of domains to derive a pattern, a grouping, a quantitative measure, or other distinguishable traits. For example, comparing a first anomaly score from a first domain against a second anomaly score from a second domain using a calculation rule (e.g. median, average, mode, etc.), a weighted rule (e.g. a first anomaly score receives 70% weight, while a second anomaly score receives 30% weight), or a priority rule (e.g. a second anomaly score overrides a first anomaly score in its importance) is an example of applying a fusion rule.

In addition, for the purpose of describing the invention, a term "generic learning procedure" is defined as an intelligent procedure capable of deriving one or more rules from conditions, patterns, data collection, historical data, and other sources of information. In a preferred embodiment of the invention, a generic learning procedure may be used in a learning agent, a mining engine, and/or a normal data profile construction for data analysis and rule creations.

Furthermore, for the purpose of describing the invention, a term "agent" is defined as a data collection or a monitoring mechanism in a domain. For example a learning "agent" in a first domain may be a speed sensor for moving boats in a lake. In another example, a learning "agent" in a second domain may be a script program associated with a search engine for monitoring search terms into the search engine. In a preferred embodiment of the invention, a learning agent may be configured to collect, consider, and/or incorporate more than one source or one dimension of information. For example, a learning agent can develop a simple or complicated rule based on a generic learning procedure from historical or collected data. An example of a rule developed by a learning agent may be something like "when the lake is under a high amount of traffic, a motorboat slows down," based on the collected data of boat speeds in the lake, historical data, or other source of information available to the learning agent.

Most of the conventional anomaly detection systems tend to identify excessive amount of potential anomalies, without a coherent mechanism to reduce high false alarm rates. Various embodiments of the present invention disclose one or more systems and methods embodying a unique combination of a generic learning procedure per domain, a dynamic on-the-fly creation of a normal data profile per domain, and a novel concept of cross-domain or domain-independent "fusion rules" and related multiple domain analysis to provide more accurate critical event notifications to a user while reducing false alarm rates. Furthermore, various embodiments of the present invention also provide an intuitive interface called an "anomaly score user interface" (e.g. FIG. 5) to visualize a severity of anomalous data per domain, or per multiple domains in case of applying fusion rules to derive multiple domain anomaly visualizations.

One aspect of an embodiment of the invention provides an anomaly detection system utilizing a generic learning procedure per domain for collecting data, wherein the data is used to create and determine a normal data profile and anomalous data relative to the normal data profile. Furthermore, another aspect of an embodiment of the invention provides a multiple domain anomaly detection system which receives indications of anomalous data (e.g. anomaly scores from each domain) from anomaly detection systems for each domain, wherein the multiple domain anomaly detection system applies one or more fusion rules to the indications of anomalous data from multiple domains to derive a multiple-domain anomaly score. In addition, another aspect of an embodiment of the invention provides an anomaly score user interface containing an anomaly score meter and a critical event table for intuitive visualization of a severity of anomalous data per domain, or a severity of anomalous data per multiple domains after applying fusion rules.

Furthermore, another aspect of an embodiment of the invention provides a method for assessing a piece of new information against a normal data profile to determine a magnitude of its potential anomaly in a domain by deriving an anomaly score per domain, and using a multiple domain anomaly detection system to analyze a plurality of anomaly scores to derive a multiple-domain anomaly score. This method may include the steps of: generating a normal data profile from historical data sources; storing the normal data profile in a data storage associated with a domain-specific anomaly detection system; comparing the piece of new information against the normal data profile; generating an anomaly score per domain; and collecting a plurality of anomaly scores from a plurality of domain-specific anomaly detection systems; triggering fusion rules to derive a multiple-domain anomaly score; and graphically displaying the result.

FIG. 1 shows a flowchart (10) for analyzing and visualizing anomalous data as anomaly scores and graphical information, in accordance with an embodiment of the invention. In a preferred embodiment of the invention, "new information" in STEP 100 may be structured and/or unstructured data gathered from a learning agent (i.e. data collection or a monitoring mechanism) in a domain. Structured data has a defined format for certain applications. For example, information configured to be stored in a database table with concretely-defined categories may be called structured data. On the other hand, unstructured data generally does not have a defined format and may be a conglomeration of information collected from a learning agent. Furthermore, the new information in STEP 100 may be real-time data or historical data based on a newly-added report detected by the learning agent.

In the preferred embodiment of the invention as shown in STEP 100, the new information in form of structured and/or unstructured data may be transformed, converted, and/or translated into a standardized (i.e. unified) format, which an anomaly detection system of the present invention can analyze. In one embodiment of the invention, a data parser, a metadata generator, and/or a data transformation/translation program may be utilized to take the new information from a learning agent and output transformed data in a standardized format, thereby allowing an anomaly detection system to analyze the standardized data originating from the learning agent and derive an anomaly score, as shown in STEP 101. In general, STEP 100 and STEP 101 can occur in an individual anomaly detection system per domain, with at least one learning agent providing "new information" of STEP 100 in each domain.

It should be noted that a learning agent, as described previously, is defined as a data collection/monitoring mechanism in a domain. A learning agent, for example, may be a sensor, a monitoring software or hardware tool, a security camera, a database, or another source of information. For example a learning agent in a first domain may be a speed sensor for moving boats in a lake. In another example, a learning agent in a second domain may be a script program associated with a search engine for monitoring search terms into the search engine.

Furthermore, a single learning agent may be configured to collect, consider, and/or incorporate more than one source or one dimension of information. For example, a learning agent can develop a simple or complicated rule based on a generic learning procedure from historical or collected data. An example of a rule developed by a learning agent may be something like "when the lake is under a high amount of traffic, a motorboat slows down," based on the collected data of boat speeds in the lake, historical data, or other source of information available to the learning agent. New information gathered from each learning agent may be in structured and/or unstructured forms, and an anomaly detection system per domain may need to convert, transform, and/or translate the raw version of new information prior to further analysis for anomalous data detection.

Continuing with FIG. 1, once the new information is in a standardized format for further analysis, an anomaly detection engine in an anomaly detection system can be utilized to derive an anomaly score, as shown in STEP 101. In one embodiment of the invention, the anomaly detection engine is configured to compare a normal data profile against the new information and generate an anomaly score, wherein a magnitude of the anomaly score positively correlates to a magnitude of anomaly of the new information against the normal data profile. For example, an anomaly score of zero or something close to zero may indicate zero to minimal chances of significant anomaly in the new information. On the other hand, a high anomaly score (e.g. 90 out of 100) may indicate high chances of significant anomaly in the new information. Likewise, a medium anomaly score (e.g. 50 out of 100) may indicate moderate chances of significant anomaly in the new information.

In one embodiment of the invention, the anomaly detection engine may compare the new information against the normal data profile, and utilize statistical, mathematical, and/or algorithmic methods to determine how much the new information deviates from the normal data profile. For example, in one domain, a motorboat moving at 50 percent slower speed currently (i.e. new information) than the average speeds of motorboats in a lake (i.e. collected in the normal data profile for this domain) may be statistically determined to be significantly anomalous, thereby resulting in a high anomaly score. In another example, in another domain, a foggy weather in the same lake in the current season may be considered "normal," resulting in a low anomaly score because a normal data profile of weather history for the lake does not deviate much from the current foggy weather condition. Yet in another example, in another domain, a news report of accidents, activities, and current events in the same lake may indicate that there is an unusually high amount of traffic in the lake, thereby resulting in a high anomaly score because the high amount of traffic is unusual for the lake.

As described in the above-examples, learning agents (e.g. a speed sensor, a weather forecast updater tool, a location-specific current news updater tool, and etc.) and analytical determination of anomaly scores can be initially independently derived without cross interaction of domains. In the first domain example above, with the speed sensor as a learning agent for motorboats in a lake, the motorboat traveling 50% slower than the normal data profile of average motorboat speed in the lake is determined to be unusual. Therefore, the anomaly score is high for the first domain. In the second domain example above, with the weather forecast updater tool as a learning agent for the weather conditions of the lake, the foggy weather can be determined typical for the season against the normal data profile of historical weather data. Furthermore, in one embodiment of the invention, the learning agent of the second domain may also formulate a rule for the normal data profile from its generic learning process that the foggy weather tends to slow the speed of motorboats in the lake. Therefore, the anomaly score may be determined to be low for the second domain. Furthermore, in the third domain example above, with the location-specific current news updater tool, the high amount of traffic in the lake is determined to be unusual against the normal data profile of lake traffic. Therefore, the anomaly score for the third domain is determined to be high.

Continuing with FIG. 1, each anomaly score per domain may be initially independently derived without cross-domain analysis. As shown in STEP 102, visualizing an anomaly score per domain may be achieved by displaying an anomaly score per domain, and/or displaying an anomaly score meter (e.g. FIG. 6) per domain. Furthermore, as shown in STEP 103, the new information analyzed in each domain may determine its own critical event (e.g. a low speed of a motorboat in the first domain example, a foggy weather in the lake in the second domain example, a high amount of traffic in the lake in the third domain example, and etc.) and report and visualize those critical events accordingly, as shown in STEPs 104, 105, and 106.

In a preferred embodiment of the invention, a plurality of anomaly detection systems, each of which capable of analyzing its domain-specific anomalous data using its domain-specific normal data profile, can be operatively connected to a multiple domain anomaly detection system with one or more "fusion rules." As described previously, fusion rules are analytical rules or conditions applicable to datasets (e.g. some of the new information from numerous domains) or outputs (e.g. anomaly scores from numerous domains) from a plurality of domains.

In the above-mentioned three-domain example involving a motorboat's speed (i.e. the first domain), current weather conditions (i.e. the second domain), and location-specific current news (i.e. the third domain), a multiple domain anomaly detection system in accordance with an embodiment of the present invention may use a mathematical fusion rule (e.g. median, average, mode, etc.), a weighted fusion rule (e.g. a first anomaly score from the first domain receives 50% weight, while a second anomaly score from the second domain and a third anomaly score from the third domain each receives 25% weight), and/or a priority fusion rule (e.g. a second anomaly score overrides a first anomaly score and a third anomaly score in its importance). In a preferred embodiment of the invention, applying one or more fusion rules in the multiple domain anomaly detection system with datasets or outputs from domain-specific anomaly detection systems results in a multiple-domain anomaly score.

For example, if a weighted fusion rule is applied in the above-mentioned three-domain example, with the first anomaly score (i.e. a high number for the first anomaly score) from the first domain at 50% weight, and the second and the third anomaly scores from the second and the third domains with 25% weight each (i.e. a low number for the second anomaly score, and a high number for the third anomaly score), the multiple-domain anomaly score based on the weighted fusion rule of this particular example is going to be a high number, thereby indicating a high chance of an important anomaly from multi-domain perspective. In another example, if a priority fusion rule is utilized in deriving a multiple-domain anomaly score, wherein the priority fusion rule defines the second anomaly score (i.e. a low number) to override the first anomaly score (i.e. a high number) and the third anomaly score (i.e. a high number) in its importance, then the multiple-domain anomaly score based on this priority fusion rule is going to be a low number.

In another embodiment of the invention, a fusion rule may also incorporate datasets or output from a learning agent, a database, or an external information resource associated with the multiple domain anomaly detection system to further improve accuracy in deriving a multiple-domain anomaly score based on outputs or datasets from domain-specific anomaly detection systems. Furthermore, in one embodiment of the invention, a multiple-domain anomaly detection system may not have to be aware of individual rules derived in domain-specific anomaly detection systems (e.g. rules which may have been derived using generic learning procedures in their domain-specific learning agents and mining engines), because the multiple-domain anomaly detection system may simply receive standardized outputs such as domain-specific anomaly scores, which isolate much of the domain-specific individual rules applied to the domain-specific anomaly detection systems from the multiple-domain anomaly detection system.

Figure 2:
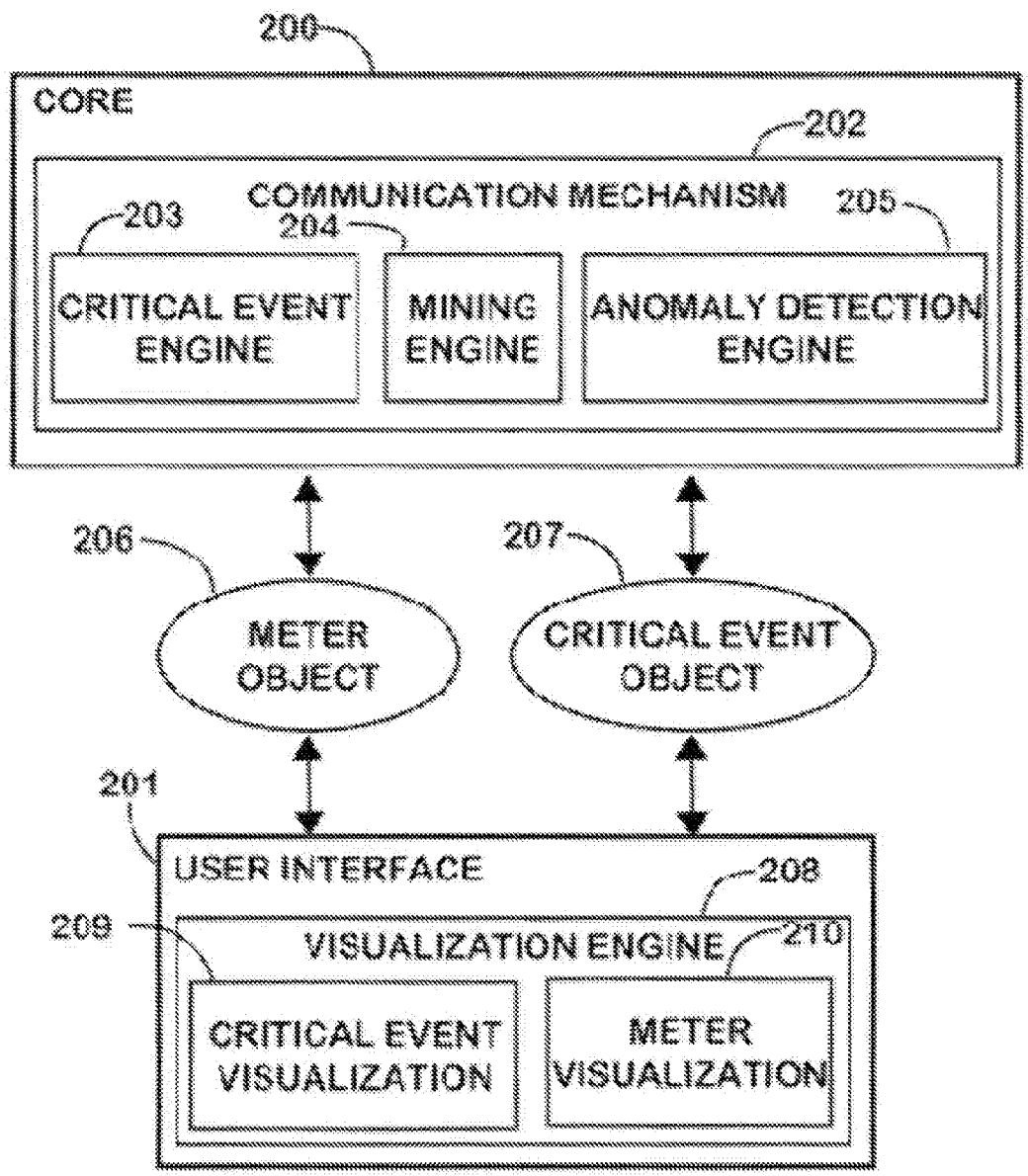
FIG. 2 shows a system block diagram representing an anomaly detection system per domain, in accordance with an embodiment of the invention.

FIG. 2 shows a system block diagram (20) representing an anomaly detection system per domain, in accordance with an embodiment of the invention. In a preferred embodiment of the invention, the anomaly detection system per domain comprises a core component (200), a meter object (206), a critical event object (207), and a user interface component (201). In one embodiment of the invention, the core component (200) includes a communication mechanism (202), which comprises a critical event engine (203), a data mining engine (204), and an anomaly detection engine (205).

In the preferred embodiment of the invention, the core component (200) is configured to enable communication among learning agents (e.g. sensors, script programs, other data-gathering mechanisms, and etc.) operatively connected to data collection entities such as the mining engine (204), data analytical entities such as the anomaly detection engine (205), and event reporting entities such as the critical event engine (203). Input data to and output data from the anomaly detection system may also be encoded and decoded by the communication mechanism (200) and then delegated to an appropriate component or to another portion of the anomaly detection system.

In one embodiment of the invention, the mining engine (204) is capable of directing to and receiving information from one or more learning agents operatively connected to an anomaly detection system. Learning agents which the mining engine (204) can control and receive information from include sensors, web monitoring tools, network hardware and/or software monitoring tools, security cameras, and other data monitoring equipment. The mining engine (204) helps the anomaly detection system to build a normal data profile, as more information are collected and analyzed as data points per domain. In a preferred embodiment of the invention, the normal data profile is dynamically updated based on activities of learning agents. In another embodiment of the invention, the normal data profile may be static or become static after a certain amount of data collection and analysis. A domain-specific anomaly detection system may have one or more normal data profiles per domain, and these normal data profiles may be shared across a multiple number of anomaly detection systems, if cross-domain sharing of the normal data profiles are desirable.

Continuing with FIG. 2, analysis of new information received from the learning agents are processed by the anomaly detection engine (205). In a preferred embodiment of the invention, the new information may have to be parsed, converted, transformed, and/or translated into a standardized format. Then, the new information in the standardized format is compared statistically, mathematically, and/or algorithmically against the normal data profile to determine its magnitude of deviation from the normal data profile.

Then, in one embodiment of the invention, the anomaly detection engine (205) is configured to generate an anomaly score, wherein a magnitude of the anomaly score positively correlates to a magnitude of anomaly of the new information against the normal data profile. For example, an anomaly score of zero or something close to zero may indicate zero to minimal chances of significant anomaly in the new information. On the other hand, a high anomaly score (e.g. 90 out of 100) may indicate high chances of significant anomaly in the new information. Likewise, a medium anomaly score (e.g. 50 out of 100) may indicate moderate chances of significant anomaly in the new information.

Figure 6:
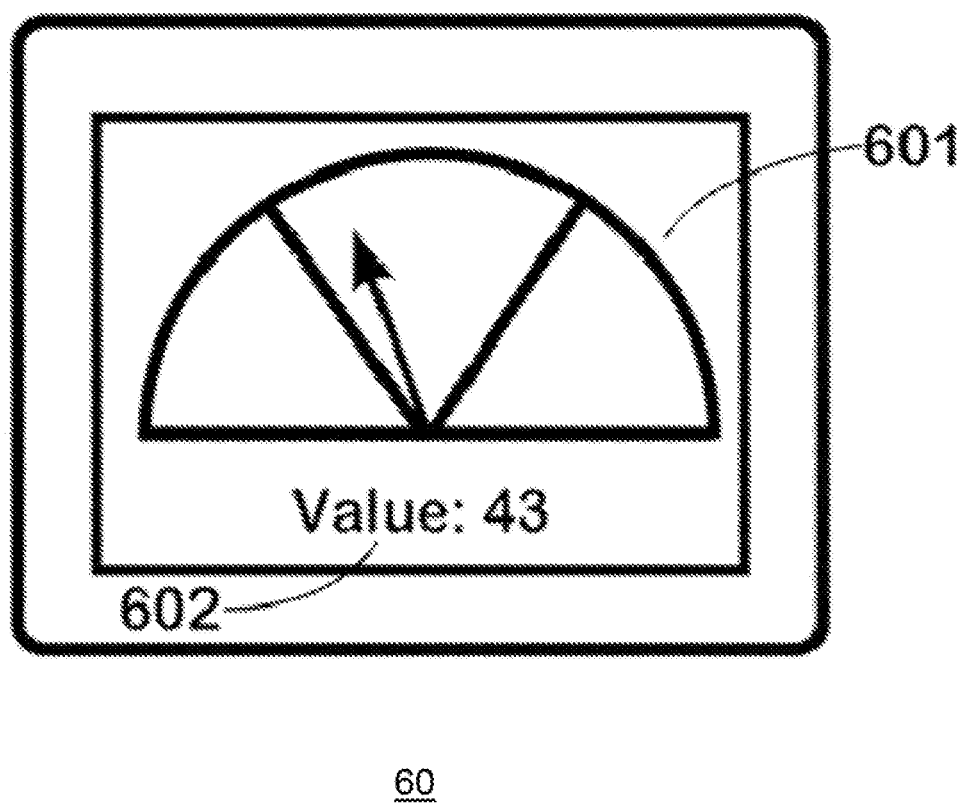
FIG. 6 shows an anomaly score meter with a gauge and an anomaly score, in accordance with an embodiment of the invention.

In a preferred embodiment of the invention, the anomaly score is a decimal value ranging between 0 and 100, where a score of 0 indicates a least chance of anomaly, a score of 100 indicates a highest chance of anomaly relative to the normal data profile. In the preferred embodiment of the invention, an anomaly score per domain can be placed into a data object called "meter object" (206), which allows a graphical representation of the anomaly score such as an anomaly score meter as shown in FIG. 6.

Continuing with FIG. 2, a critical event engine (203) is capable of processing the anomaly score from one domain or from multiple domains. If the critical event engine (203) is configured to generate critical events based on only one domain, then anomalous data determined by the anomaly detection engine (205) in one particular domain may generate a list of critical events (e.g. FIG. 7) for that domain. On the other hand, if the critical event engine (203) is configured to generate critical events based on datasets or outputs from multiple domains (e.g. a plurality of anomaly scores from a plurality of domain-specific anomaly detection systems), then one or more fusion rules may be used to generate a multiple-domain anomaly score and a correlating multiple-domain critical event list. It should be noted that the present invention uniquely allows multiple domain analysis to be seamless, scalable, and easily adjustable by utilizing a unique concept of "fusion rules," which are applicable to outputs or datasets originating from individual domain-specific anomaly detection systems. Furthermore, a multiple domain anomaly detection system (e.g. 301) operatively connected to a plurality of domain-specific anomaly detection systems, as shown in FIG. 3 for example, allows the multiple-domain anomaly detection highly scalable, potentially allowing as many domains or dimensions a user desires for a combined (i.e. fusion rule-based) analysis to improve relevance and accuracy of anomaly determination from a variety of information sources.

Continuing with FIG. 2, anomaly scores from the anomaly detection engine (205) and from multiple detection systems may be further processed by the critical event engine (203) for application of fusion rules. These fusion rules can be configured to look for specific patterns, groupings, quantitative measures, and/or other distinguishable traits for potentially triggering critical event notifications. For example, a potential credit card fraud may be triggered as a critical event, when a large amount of charges occur in a short time frame in one or more domains for anomaly data detection. In one embodiment of the invention, the critical event engine (203) places a list of critical events in a critical event object (207). The critical event object (207) allows critical events to be represented as a standardized and/or structured data to enable other components such as the user interface (201) to interpret the critical events for visual representation.

In one embodiment of the invention, a visualization engine (208) comprises a critical event visualization component (209) and a meter visualization component (210), as shown in FIG. 2. The critical event visualization component (209) is capable of visually representing the critical event object (207) as a graph, a table, or another visual representation on a display screen. In addition, the meter visualization component (210) is capable of visually representing the meter object (206) on a display screen. In a preferred embodiment of the invention, the user interface (201) may be associated with a computer display screen operatively connected to a CPU, a memory unit, a graphics card, and a storage unit of a computer. In this preferred embodiment of the invention, the visualization engine (208) may be at least partially executed or implemented by the graphics card. In another embodiment of the invention, the user interface (201) may be a touch screen interface on a mobile device, such as a smart phone, and the visualization engine (208) may be at least partially executed or implemented by a graphics processing unit in the mobile device.

Figure 3:
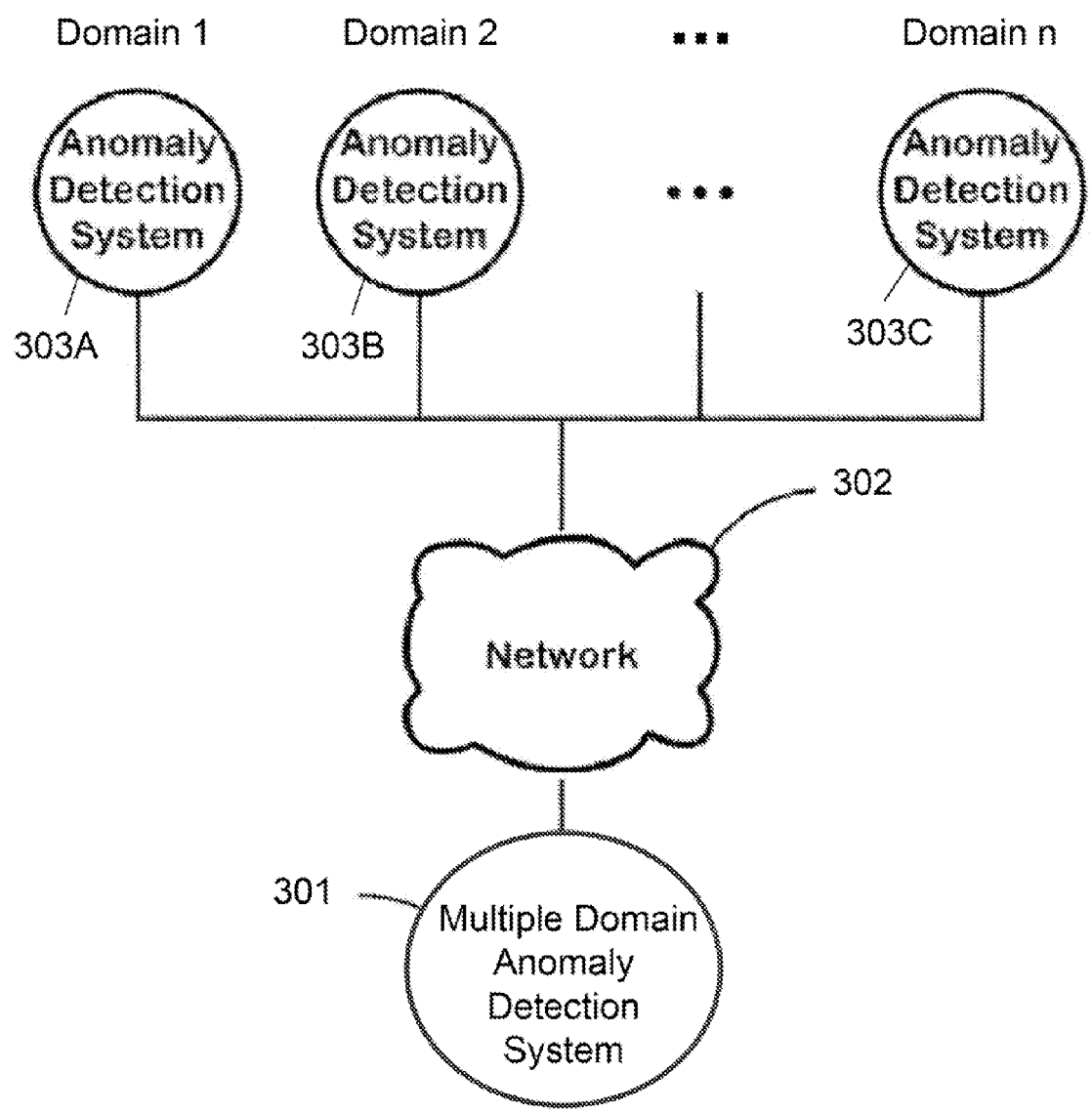
FIG. 3 shows a system diagram showing a plurality of anomaly detection systems operatively connected to a multiple domain anomaly detection system via a data network, in accordance with an embodiment of the invention.

FIG. 3 shows a system diagram (30) showing a plurality of domain-specific anomaly detection systems (303A, 303B, 303C, and etc.) operatively connected to a multiple domain anomaly detection system (301) via a data network (302), in accordance with an embodiment of the invention. In a preferred embodiment of the invention, each domain-specific anomaly detection system (303A, 303B, or 303C) is capable of determining its own domain-specific anomaly score based on its domain-specific normal data profile. Furthermore, in the preferred embodiment of the invention, each domain-specific anomaly detection system (303A, 303B, or 303C) has a learning agent with a generic learning procedure to collect sufficient amount of data to formulate its own domain-specific normal data profile vs. anomalous data which deviates substantially from its domain-specific normal data profile.

As shown in FIG. 3, in the preferred embodiment of the invention, the multiple domain anomaly detection system (301) is configured to receive at least some datasets or outputs (e.g. domain-specific anomaly scores) from the plurality of domain-specific anomaly detection systems (303A, 303B, 303C, and etc.) via a data network (302) such as the Internet and/or a local area network (LAN). Then, as described previously for other figures, the multiple domain anomaly detection system (301) is capable of applying one or more fusion rules to derive a multiple-domain anomaly score and a related visual representation, such as a multiple-domain anomaly score meter (e.g. 501 of FIG. 5).

Figure 4:
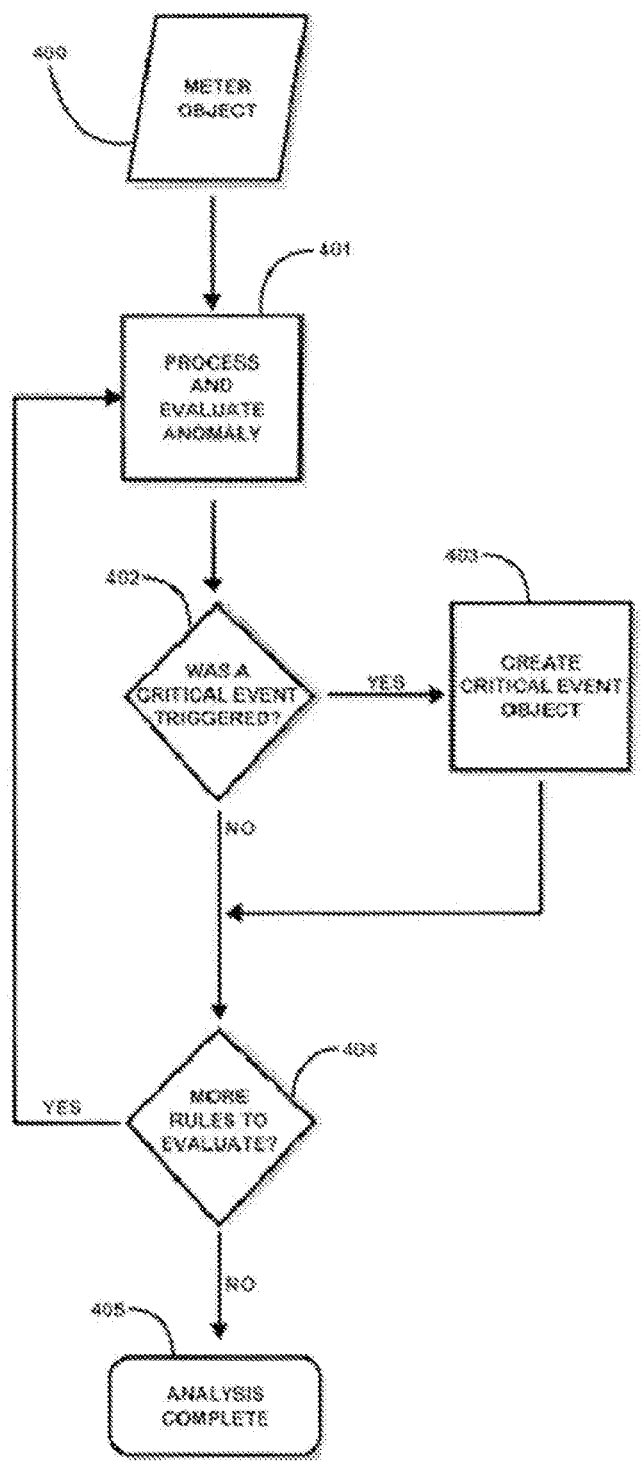
FIG. 4 shows a flowchart for a critical event engine when evaluating anomalous data for a potential reporting of a critical event, in accordance with an embodiment of the invention.

FIG. 4 shows a flowchart (40) for a critical event engine when evaluating anomalous data for a potential reporting of a critical event using fusion rules for multiple domains, in accordance with an embodiment of the invention. In a preferred embodiment of the invention, one or more meter objects are created by one or more anomaly detection engines from multiple domains, as shown in STEP 400. Then, a single fusion rule is applied to the one or more meter objects to determine whether a critical event worthy of reporting is triggered by this fusion rule evaluation, as shown in STEP 401. If the critical event is triggered, as shown in STEP 402, then a critical event object is created as shown in STEP 403 to enable visualization of a critical event in a visualization engine, as previously described for the user interface (201) in FIG. 2. Then, if there is another fusion rule to evaluate, as shown in STEP 404, this new fusion rule is subsequently applied to the one or more meter objects to determine generation of another critical event, as indicated by the loop-back arrow to STEP 401. At some time during these procedures, if there is no more fusion rule to evaluate, then the multiple domain anomaly detection system completes the analysis, in accordance with an embodiment of the invention shown in FIG. 4.

In one embodiment of the invention, the meter object (e.g. 206 of FIG. 2) and the critical event object (e.g. 207 of FIG. 2) are data structures utilized to hold information representing an anomaly score of one or more domains and a critical event derived from one or more domains, respectively. In one embodiment of the invention, the meter object contains a reference to the anomaly score and its related information. Furthermore, the anomaly detection engine can create this meter object for use by other components such as the visualization engine (e.g. 209 of FIG. 2). In addition, in one embodiment of the invention, a critical event object contains a reference to a critical event and its related information. The data structures of both objects may be subject to conversion and transformation as needed within the multiple domain anomaly detection system.

Figure 5:
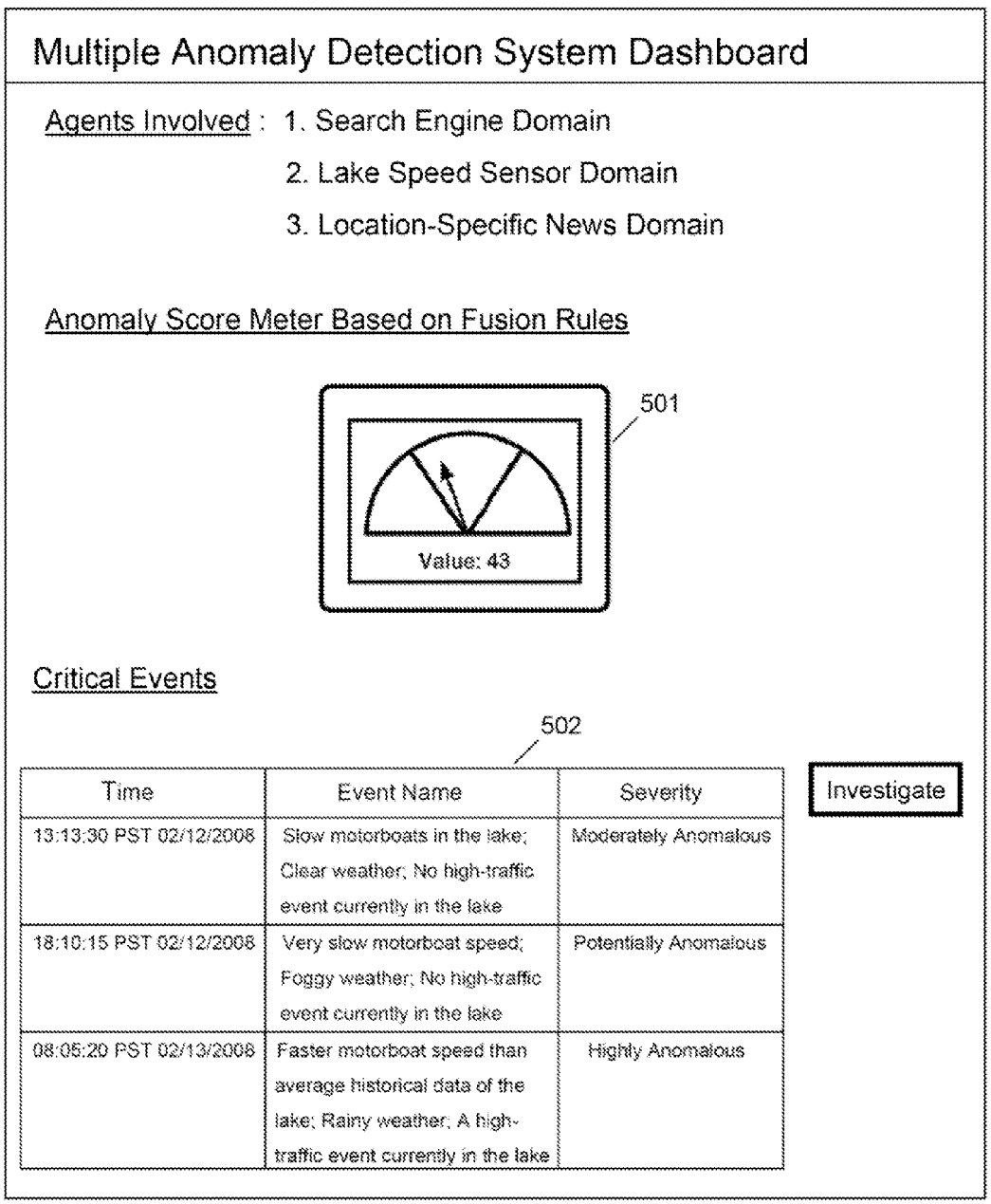
FIG. 5 shows an anomaly score user interface from an anomaly detection system, in accordance with an embodiment of the invention.

FIG. 5 shows an anomaly score user interface (50) for an anomaly detection system, in accordance with an embodiment of the invention. In a preferred embodiment of the invention, the anomaly score user interface (50) contains a list of learning agents used for a multiple-domain anomaly score derivation. In the example shown in FIG. 5, the list of learning agents includes a search engine domain, a lake speed sensor domain, and a location-specific news domain. Furthermore, in the preferred embodiment of the invention, the anomaly score user interface (50) also includes a multiple-domain anomaly score meter (501) based on one or more fusion rules applied to a plurality of domains. In this particular example, a multiple-domain anomaly score of 43 is displayed with a corresponding graphical meter (501) for this score.

In addition, in the preferred embodiment of the invention, a list of critical events is also included in the anomaly score user interface (50) as a critical event table (502), wherein the critical event table (502) discloses an event name, a timestamp, and a magnitude of severity (e.g. highly anomalous, moderately anomalous, potentially anomalous, and etc.) for anomalous data for each critical event entry. In one embodiment of the invention, a user who may want to look at a particular critical event entry in detail can choose or highlight that particular critical event and click on the "investigate" button to review more elaborate data related to that particular critical event.

FIG. 6 shows an anomaly score meter (60) with a gauge (601) and an anomaly score (602), in accordance with an embodiment of the invention. In one embodiment of the invention, this anomaly score meter (60) may be utilized to represent an anomaly score (602) and a corresponding gauge (601) for one domain. In another embodiment of the invention, this anomaly score meter (60) may be utilized to represent a multiple-domain anomaly score (602) and a corresponding gauge (601), if one or more fusion rules are applied to derive the multiple-domain anomaly score (602) from datasets or outputs from a plurality of domain-specific anomaly detection systems.

FIG. 7 shows a critical event table (70) derived from an anomaly detection system, in accordance with an embodiment of the invention. In one embodiment of the invention, the critical event table (70) shows a timestamp (701) for a critical event entry, an event name (702), and a magnitude of severity (e.g. highly anomalous, moderately anomalous, potentially anomalous, and etc.) (703) for anomalous data for each critical event entry. In another embodiment of the invention, the critical event table (70) may contain other information relevant to a critical event.

Various embodiments of the present invention may provide several advantages over conventional anomaly detection systems. For example, a unique combination of a generic learning procedure per domain using a learning agent and/or a mining engine to derive domain-specific rules, a dynamic creation of a normal data profile per domain using collected data or historical data, new information comparison against this normal data profile per domain, and a cross-domain or domain-independent "fusion rules" and related multiple domain analysis to provide more accurate critical event notifications and multiple-domain anomaly scores may provide more accurate and useful alerts to a user while reducing false alarm rates. Furthermore, one or more embodiments of the present invention also provide a user interface called an "anomaly score user interface" (e.g. FIG. 5) to visualize a severity of anomalous data per domain, or per multiple domains in case of applying fusion rules to derive multiple domain anomaly visualizations. This user interface may be more heuristic and intuitive than existing anomaly detection system interfaces.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fusion rule-based anomaly detection system, the system comprising:
   a learning machine agent, which is a physical sensor, a security camera, or another environmental monitoring sensor, for each domain configured to transmit a piece of new information to a data mining engine module operatively connected to the learning machine agent;
   a normal data profile for each domain executed in an electronic system per domain, wherein the normal data profile of each domain is created by a generic learning procedure and data collection using the learning machine agent per domain;
   an anomaly detection engine module for each domain operatively connected to the data mining engine module for each domain, wherein the anomaly detection engine is configured to compare the piece of new information against the normal data profile to generate an anomaly score for each domain;
   a multiple-domain anomaly detection system operatively connected to a plurality of domain-specific anomaly detection systems, wherein each domain-specific anomaly detection system contains its own learning machine agent, its own normal data profile, and its own anomaly detection engine;
   a weighted or priority fusion rule executed in the multiple-domain anomaly detection system, wherein the weighted or priority fusion rule generates a multiple-domain anomaly score by placing a higher weight or priority on one domain-specific anomaly score over another domain-specific anomaly score, wherein the weighted or priority fusion rule remains isolated from internal data sets and internal requirements of each domain; and
   a data network operatively connecting the multiple-domain anomaly detection system and the plurality of domain-specific anomaly detection systems for data communication.

2. The fusion rule-based anomaly detection system of claim 1, further comprising a critical event engine module configured to generate a critical event entry for visualization if the anomaly score for a particular domain or the multiple-domain anomaly score is sufficiently high to trigger generation of the critical event entry.

3. The fusion rule-based anomaly detection system of claim 1, further comprising a meter object and a critical event object which are used for visualization of a critical event and an anomaly score meter with a gauge.

4. The fusion rule-based anomaly detection system of claim 1, further comprising a user interface operating on a user's computer or a user's mobile device, wherein the user interface is configured to display a multiple-domain anomaly score meter based on the weighted or priority fusion rule and a critical event table with one or more critical event entries.

5. The fusion rule-based anomaly detection system of claim 4, further comprising an on-screen button or another mechanism to invoke more detailed information for a particular critical event entry.

6. The fusion rule-based anomaly detection system of claim 2, wherein the critical event entry comprises a timestamp for a critical event, an event name, and a level of severity.

7. The fusion rule-based anomaly detection system of claim 1, wherein the weighted or priority fusion rule is an analytical rule or a condition which may be applied to datasets or outputs from the plurality of domain-specific anomaly detection systems to derive a pattern, a grouping, a quantitative measure, or other distinguishable traits.

8. The fusion rule-based anomaly detection system of claim 1, wherein the piece of new information from the learning machine agent is converted, transformed, or translated into a standardized format for convenient parsing and analysis by the anomaly detection engine.

9. A method for assessing a piece of new information against a particular domain and also against a plurality of other domains using a multiple-domain anomaly detection system that incorporates a plurality of hardware-based sensors as learning machine agents, the method comprising the steps of:
   determining, with an electronic system operating in the particular domain, a magnitude of data anomaly for the piece of new information generated by a learning machine agent of the particular domain by comparing a normal data profile created and managed by the particular domain against the piece of new information to generate a domain-specific anomaly score for the particular domain, wherein the learning machine agent is physical sensor, a security camera, or another environmental monitoring sensor;
   activating the multiple-domain anomaly detection system to receive the domain-specific anomaly score already-computed from the particular domain and other desired domain-specific anomaly scores already-computed from other domains; and
   applying a weighted or priority fusion rule that places a higher weight or priority on the domain-specific anomaly score for the particular domain over the other desired domain-specific anomaly scores from the other domains to generate a multiple-domain anomaly score from the multiple-domain anomaly detection system, wherein the weighted or priority fusion rule remains isolated from internal data sets and internal requirements of each domain.

10. The method of claim 9, wherein the normal data profile is generated from historical data sources, or from a data collection activity of a learning machine agent operatively connected to a domain-specific anomaly detection system for the particular domain, wherein the domain-specific anomaly detection system is operatively connected to the multiple-domain anomaly detection system.

11. The method of claim 9, wherein the weighted or priority fusion rule is an analytical rule or a condition which may be applied to datasets or outputs from the particular domain and the plurality of other domains to derive a pattern, a grouping, a quantitative measure, or other distinguishable traits.

12. The method of claim 9, further comprising the step of displaying the multiple-domain anomaly score, a multiple-domain score meter, and a critical event table with one or more critical event entries on a display screen of a user's computer or a user's mobile device.

13. The method of claim 12, wherein each of the one or more critical event entries comprises a timestamp for a critical event, an event name, and a level of severity.

14. The method of claim 10, wherein the piece of new information from the learning machine agent is converted, transformed, or translated into a standardized format for convenient parsing and analysis by an anomaly detection engine.

* * * * *